No. 842,208. PATENTED JAN. 29, 1907.
F. L. KIRKMAN.
SIDE DELIVERY HAY RAKE.
APPLICATION FILED OCT. 29, 1906.

3 SHEETS—SHEET 1.

WITNESSES:
F. C. Barry
M. A. Schmidt

INVENTOR
F. L. Kirkman.
BY Milo B. Stevens & Co.
Attorneys

No. 842,208. PATENTED JAN. 29, 1907.
F. L. KIRKMAN.
SIDE DELIVERY HAY RAKE.
APPLICATION FILED OCT. 29, 1906.

3 SHEETS—SHEET 2.

WITNESSES:
F. C. Barry
M. A. Schmidt

F. L. Kirkman
INVENTOR

BY Milo B. Stevens & Co.
Attorneys.

No. 842,208. PATENTED JAN. 29, 1907.
F. L. KIRKMAN.
SIDE DELIVERY HAY RAKE.
APPLICATION FILED OCT. 29, 1906.

3 SHEETS—SHEET 3.

WITNESSES:
F. C. Barry
M. A. Schmidt

INVENTOR
F. L. Kirkman.
BY Milo B. Stevens & Co.
Attorney

UNITED STATES PATENT OFFICE.

FRED LEE KIRKMAN, OF GLENWOOD, MISSOURI.

SIDE-DELIVERY HAY-RAKE.

No. 842,208.     Specification of Letters Patent.     Patented Jan. 29, 1907.

Application filed October 29, 1906. Serial No. 341,039.

*To all whom it may concern:*

Be it known that I, FRED LEE KIRKMAN, a citizen of the United States, residing at Glenwood, in the county of Schuyler and State of Missouri, have invented new and useful Improvements in Side-Delivery Hay-Rakes, of which the following is a specification.

This invention is a side-delivery hay-rake, and has for its object an improved driving mechanism for presenting the rake-teeth to the hay in a vertical position and also to retract or withdraw them.

A further object is to provide a hinged supporting-frame for the rake, so that it can be raised or lowered to vary the distance between the rake-teeth and the ground.

Figure 1:
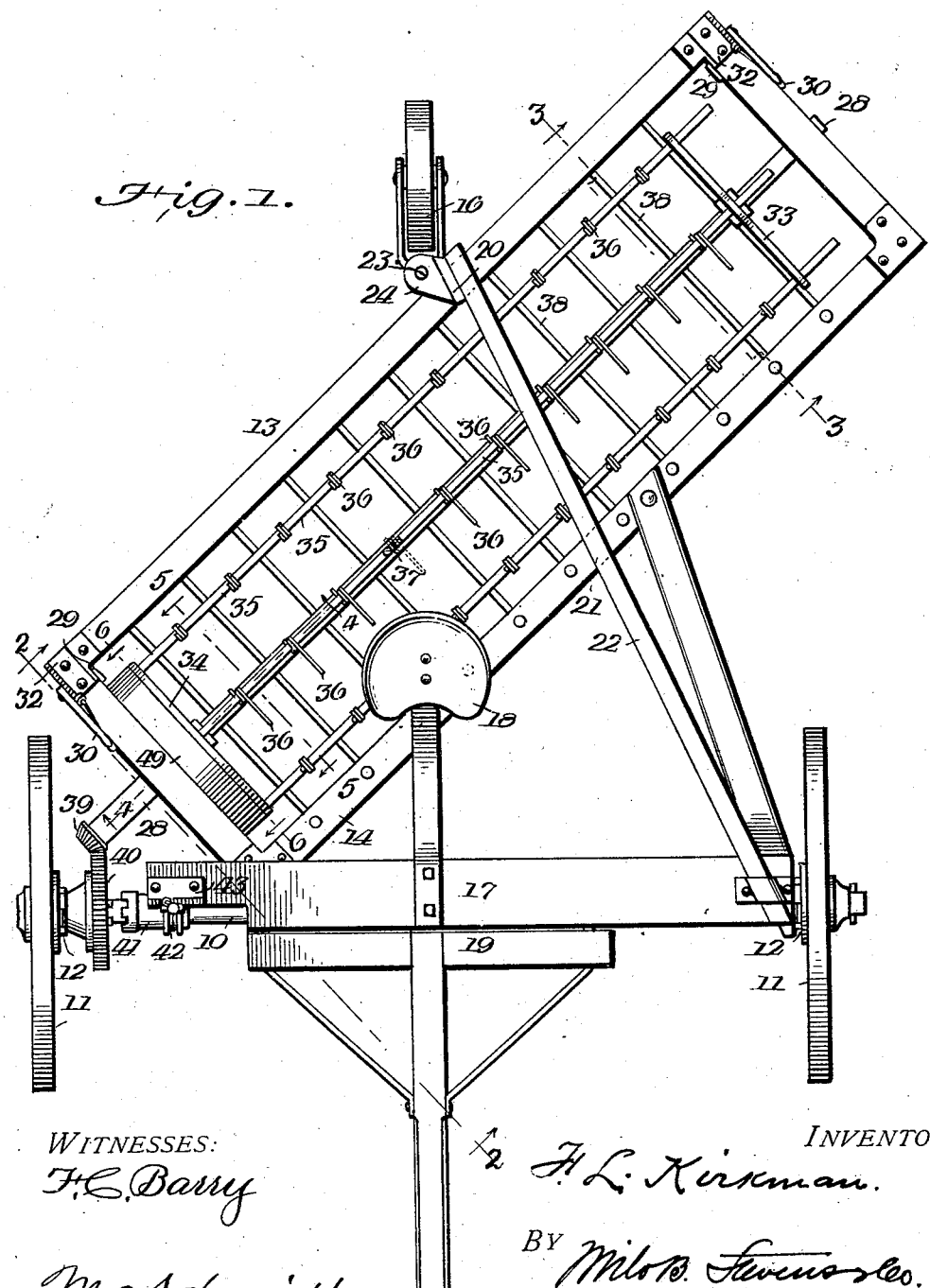
Figure 2:
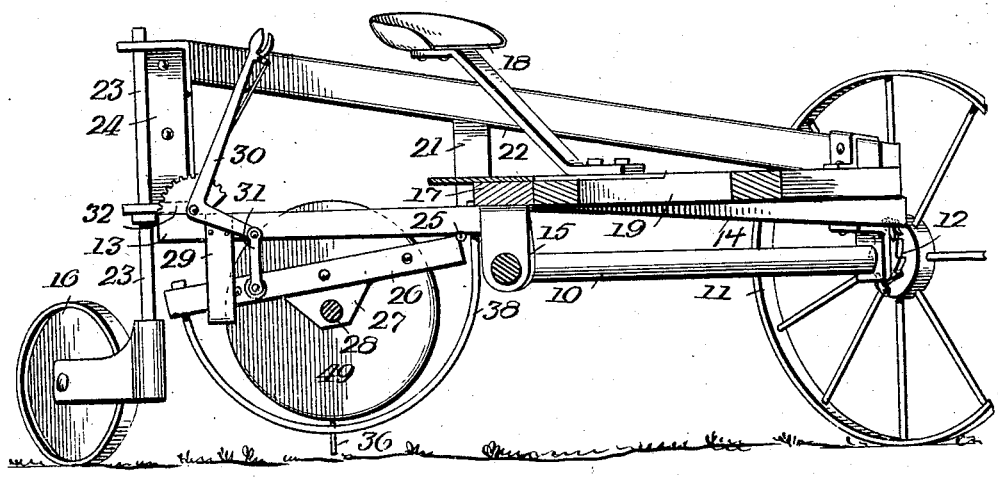
Figure 3:
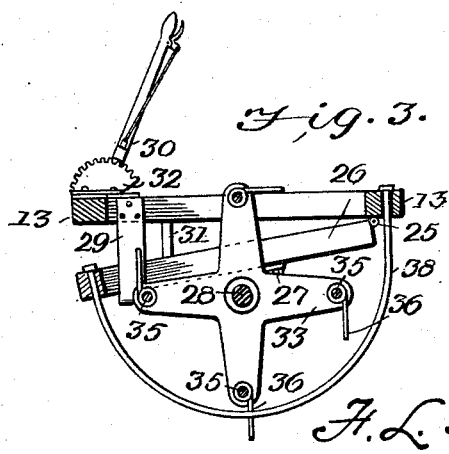
Figure 4:
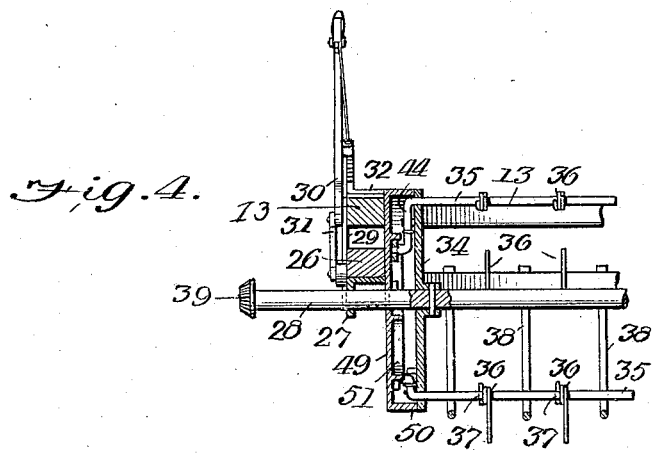
Figure 5:
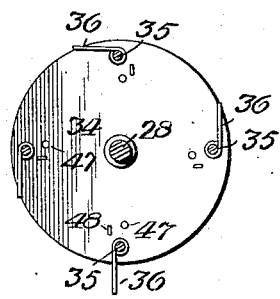
Figure 6:
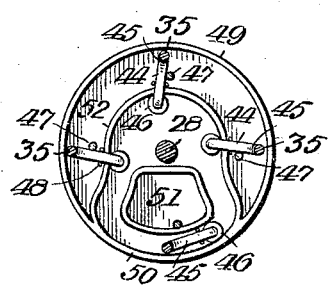
Figure 7:
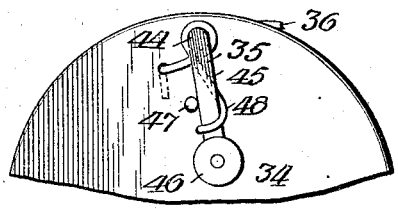

In the accompanying drawings, Figure 1 is a plan view of the invention. Fig. 2 is a vertical section on the line 2 2 of Fig. 1. Fig. 3 is a vertical section on the line 3 3. Fig. 4 is a longitudinal section on the line 4 4. Fig. 5 is a vertical section on the line 5 5. Fig. 6 is a vertical section on the line 6 6. Fig. 7 is a detail.

Referring specifically to the drawings, 10 denotes the axle of the machine, on which are loosely mounted wheels 11, with a pawl-and-ratchet connection 12 between the hub of each wheel and the axle, so that the axle will be driven in the advance movement of the machine, but will remain stationary when the machine is backed, all in the well-known manner.

The rake-frame 13 is arranged diagonally to the line of draft, as is usual in this type of machines, and is rectangular in shape. The front end of the frame is supported on the axle 10 by a beam 14, extending from the frame and mounted on the axle, and the corner of the frame nearest the axle carries a bearing 15, through which the axle extends. The rear end of the frame is supported by a caster-wheel 16. Above the axle is a transverse beam 17, which is supported at its ends on the corner of the frame 13 and the front end of the beam 14, respectively. The seat 18 of the machine is secured to the beam 17, and the draft-tongue 19 is also attached to said beam. On the front and rear ends of the frame 13 are standards 20 and 21, respectively, to which a beam 22 is fastened. The front end of said beam extends downwardly and is fastened to the beam 17. The stem 23 of the caster-wheel is swiveled in a bracket 24 on the standard 20.

To the front end of the frame 13, on the under side thereof, is hinged, as at 25, a frame 26, the end pieces of which carry bearings 27, in which a rake-shaft 28 is journaled. The rear end of the frame 26 is supported in stirrups 29, extending downwardly from the frame 13 on each side. On each side of the frame 13 are hand-levers 30, connected by links 31 with the frame 26 for raising and lowering the same. The hand-levers are fulcrumed on brackets 32, secured to the frame 13, and the usual latches and segment-racks for holding the levers in adjusted position are provided.

To the shaft 28 is keyed or otherwise made fast at one end a spider 33, and at the opposite end is fastened a disk 34. Rock-shafts 35, to which the rake-teeth 36 are connected, are journaled in the spider and disk. The teeth are coiled around the rock-shafts and made fast thereto by extending their inner ends through transverse openings 37 in said shafts. The guards or fenders for the rake are curved rods 38, connected at one end to the front bar of the frame 13 and at the other end to the rear bar of the frame 26. The rods extend loosely through the front bar, so that the frame 26 may be raised or lowered.

The rake-shaft 28 is driven by a beveled pinion 39, made fast on one end thereof and meshing with a gear 40 on the axle 10. The gear 40 is loose on the axle and is thrown into action by a suitable clutch device 41, slidable on the axle, and operated by a hand-lever 42, fulcrumed on a bracket 43, extending from the beam 17. The hand-lever is provided with the latch and segment-rack for holding it in adjusted position, and it is close to the seat 18, so that the rake can be readily thrown into or out of operation.

The ends of the rock-shaft 35 adjacent the disk 34 have lateral bends 44, forming cranks 45, at the outer ends of which are mounted friction-rollers 46. The disk 34 carries projecting stop-pins 47, against which the cranks are pressed by springs 48, secured to said disk and bearing on the cranks. The cranks and rollers extend into a cam-housing comprising a disk 49, made fast to the end piece of the frame 26 and having a peripheral flange 50, against which the disk 34 abuts, thus serving to exclude dirt, hay, &c., from the housing. The shaft 28 extends loosely through an opening in the disk 49. Inside the housing are cam-shaped tracks 51 and 52, on which the rollers 46 travel, and which are for the purpose of throwing the rake-teeth into vertical position for service by turning the rock-shafts 35 on their axes, and thus causing the teeth to advance and project below and beyond the guards 37 into active position during the lower part of the revolution and to retract or withdraw them within the guards 37 during the upper part thereof. In other words, the teeth revolve with the shaft 28 and are also oscillated by means of the rock-shaft, so as to be presented to the hay in substantially vertical position and to clear themselves therefrom as they withdraw within the guards.

In operation the rake is rotated as already described, and being disposed at an angle to the line of draft the hay will be delivered in windrows on one side of the machine. The distance between the rake-teeth and the ground is readily regulated by raising or lowering the frame 26.

I claim—

1. In a side-delivery hay-rake, a wheeled main frame, stirrups extending therefrom, a rake-supporting frame hinged at one end to the main frame and extending at the other end into the stirrups, and means for raising and lowering the rake-supporting frame.

2. In a side-delivery hay-rake, a wheel-driven shaft, a frame mounted on the shaft and carrying stop-pins, rock-shafts journaled in the frame, and having cranks at one end spring-pressed against the stop-pins, rake-teeth on the rock-shafts, and a cam engageable by the cranks for actuating the rock-shafts.

In testimony whereof I have signed my name to this specification in the presence of two subscribing witnesses.

FRED LEE KIRKMAN.

Witnesses:
JAMES P. SMITH,
ROBERT A. BUTTON.